United States Patent [19]
Gorin et al.

[11] Patent Number: 6,021,384
[45] Date of Patent: Feb. 1, 2000

[54] AUTOMATIC GENERATION OF SUPERWORDS

[75] Inventors: Allen Louis Gorin, Berkeley Heights; Giuseppe Riccardi, Hoboken, both of N.J.

[73] Assignee: AT&T Corp., New York, N.Y.

[21] Appl. No.: 08/960,291

[22] Filed: Oct. 29, 1997

[51] Int. Cl.[7] .............................. G06F 17/28; G10L 5/06; G10L 9/00
[52] U.S. Cl. ................................. 704/1; 704/255
[58] Field of Search ........................... 704/1, 9, 10, 251, 704/255, 256, 257

[56] References Cited

U.S. PATENT DOCUMENTS

| | | | |
|---|---|---|---|
| 5,384,892 | 1/1995 | Strong | 704/255 |
| 5,390,279 | 2/1995 | Strong | 704/256 |
| 5,467,425 | 11/1995 | Lau et al. | 704/255 |
| 5,642,519 | 6/1997 | Martin | 704/9 |
| 5,675,707 | 10/1997 | Gorin et al. | 704/257 |
| 5,839,106 | 11/1998 | Bellegarda | 704/257 |

OTHER PUBLICATIONS

Giachin, Egidio P., "Phrase Bigrams For Continuous Speech Recognition" ICASSLP, 1995, pp. 225–228.

*Primary Examiner*—Forester W. Isen
*Assistant Examiner*—Patrick N. Edouard

[57] ABSTRACT

This invention is directed to the automatic selection and generation of superwords based on a criterion relevant to speech recognition. Superwords are used to refer to those word combinations which are so often spoken that they can be recognized by a recognition device as being a single word.

21 Claims, 5 Drawing Sheets

AUTOMATIC GENERATION OF SUPERWORDS

This application is related to co-pending U.S. patent application Ser. No. 08/960,289, entitled "Selection of Superwords Based on Criteria Relevant to Both Speech Recognition and Understanding" (Attorney Docket No. JAO 37571), co-filed with this application, and incorporated herein by reference.

BACKGROUND OF THE INVENTION

1. Field of Invention

This invention relates to the automatic generation of superwords based on a criterion relevant to speech recognition.

2. Description of Related Art

In the art of speech recognition, a speech recognizer is used to extract recognized words from a given speech utterance. Typically, a large vocabulary recognizer is constrained by stochastic language models such as an n-gram model. One approach to such modeling to constrain the recognizer is to train a stochastic finite state grammar represented by a Variable Ngram Stochastic Automaton (VNSA). A VNSA is a non-deterministic automaton that allows for parsing any possible sequence of words drawn from a given vocabulary.

Traditionally, such n-gram language models for speech recognition assume words as the basic lexical unit. The order of a VNSA network is the maximum number of words that can be predicted as occurring after the occurrence of a particular word in an utterance. Thus, using conditional probabilities, VNSAs have been used to approximate standard n-gram language models yielding similar performance to standard bigram and trigram models. However, when the "n" in the n-gram becomes large, a database for predicting the occurrence of words in response to the appearance of a word in an utterance, becomes large and unmanageable. In addition, the occurrence of words which are not strongly recurrent in the language may be mistakenly assigned high probabilities, and thus generate a number of misdetections in recognized speech.

Thus, a method to create longer units for language modeling is needed in order to promote the efficient use of n-gram language models for speech recognition.

SUMMARY OF THE INVENTION

A method and apparatus for automatically generating and selecting superwords is provided. A training corpus T is initialized with the initial language model corresponding to a stochastic n-gram model and words. Rank candidate symbol pairs are generated based on a correlation coefficient where the probability of a word occurring denotes the probability of further words occurring sequentially. The resulting superword is selected only if the probabilities occur sequentially and the training set perplexity decreases by the incorporation of the larger lexical unit (or superword) into the model. The language model is then retrained with a lexicon comprising all of the original words and superwords, along with the newly generated superwords.

BRIEF DESCRIPTION OF THE DRAWINGS

The invention is described in detail with reference to the following drawings wherein like numerals reference like elements, and wherein.

DETAILED DESCRIPTION OF PREFERRED EMBODIMENTS

N-gram language models for speech recognition are currently implemented by using words as the basic lexical unit. However, there are several motivations for choosing longer units for language modeling. First, not all languages have a predefined word unit (e.g. Chinese). Second, many word groups or phrases are strongly recurrent in the language and can be thought as a single lexical entry, e.g. 'area code', 'I would like to' or 'New Jersey'. Third, for any model of a fixed order, we can selectively enhance the conditional probabilities by using variable length units to capture long spanning dependencies. The use of these longer lexical units is the basis for the generation of superwords.

The method for automatically generating and selecting such variable length units, or superwords is based on minimization of the language perplexity PP(T) on a training corpus T.

Perplexity can be described as follows. Natural language can be viewed as an information source W whose output is a word sequence. Thus, we can associate W to the entropy H(W) as:

$$H(W) = -\frac{1}{n}\log P(w_1, w_2, \ldots, w_n) \quad (1)$$

where $w_1, w_2, \ldots, w_n$ is the actual text (corpus).

Perplexity (PP) is used in speech recognition to measure the difficulty of a recognition task relative to a given language model. In particular, perplexity measures the "Average Branching Factor" (i.e., the average number of words, symbols or sounds that can follow any given word, symbol or sound). The larger the number of words that could possibly follow one or more words, symbols or sounds, the higher the perplexity value. For example, there are many more words that could follow the word "to" (higher perplexity value) than can follow the phrase "I would like to" (lower perplexity value).

The perplexity of a language model is defined as follows:

$$PP = 2^{LP}$$

where LP is the logprob:

$$LP = -\frac{1}{n}\log \hat{P}(w_1, w_2, \ldots, w_n) \quad (2)$$

where n is the size of the corpus $W = w_1, w_2, \ldots, w_n$ used to estimate PP and $\hat{P}(w_1, w_2, \ldots, w_n)$ is the probability estimate of the corpus W. While there has been other research into automatically acquiring entropy-reducing phrases, this work differs significantly in the language model components and optimization parameters.

Figure 1:
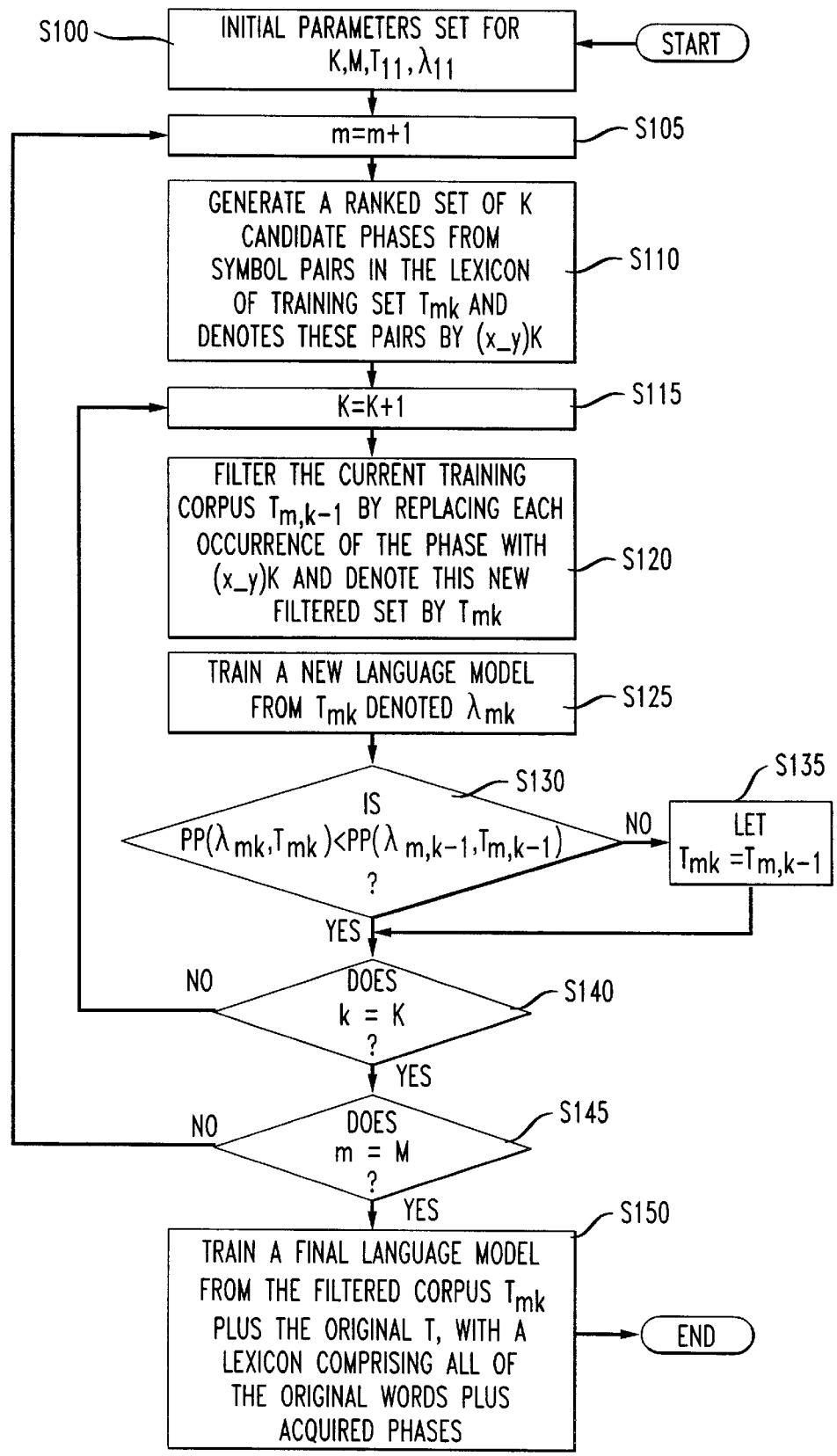
FIG. 1 is a flowchart for generating and selecting superwords.

As shown in FIG. 1, the phrase acquisition method is an iterative process which converges to a local minimum of PP(T). In particular, given a fixed model order n and a training corpus T, the method proceeds as follows.

At step S100, the initial parameters are set so that K equals the number of superword candidates generated at each iteration, and M equals the number of iterations, $T_{11}$ is set as the initial training corpus T, and $\lambda_{11}$ is set as the language model of order n corresponding to a stochastic n-gram model on words trained from that corpus. At step S105, a counter m is advanced from 1 to M, M being the number of iterations set in the parameters at step S100.

At step S110, for each iteration, candidate symbol-pairs (x,y) are ranked and generated based on a correlation coefficient $$\rho(x,y)=P(X,Y)/[P(x)+P(y)] \quad (3)$$

where P(x) denotes the probability of the event x and P(x,y) denotes the probability of the symbols x and y occurring sequentially. At the first iteration, x and y are both words, in subsequent iterations they are potentially larger units. Observe that $0 \leq \rho(x,y) \leq 0.5$. This correlation measure provides advantages with respect to ease of scaling and thresholding.

At step S115, a counter is advanced for each candidate phrase so that k=1 to K, where K is the set of superword candidates. At step S120, the current training corpus $T_{m,k-1}$ is filtered by replacing each occurrence of a superword with the superword unit $(x\_y)_k$. The new filtered superword set is denoted by $T_{mk}$.

At step S125, a new language model (still of order n) is trained from $T_{mk}$. The newly trained model is denoted by $\lambda_{mk}$. At step S130, a test is performed to determine whether adding the superword candidate decreases perplexity (i.e. whether PP $(\lambda_{mk}, T_{mk})$<PP $(\lambda_{m,k-1}, T_{m,k-1})$). If perplexity is decreased, the process is continued. If perplexity is not decreased, the superword candidate is rejected at step S135 by setting $T_{mk}=T_{m,k-1}$. Thus, a phrase x_y is selected only if $P(x,y) \cong P(x) \cong P(y)$ (i.e. $P(y|x) \cong 1$) I and the training set perplexity is decreased by incorporating this larger lexical unit into the model.

At step S140, the method tests whether any additional superword candidates, k, are required to be examined. At step S145, after all of the superword candidates are examined, the next iteration is performed, m, until m=M.

Finally, at step S150, after all iterations are performed, a final language model is trained from the filtered corpus $T_{MK}$ plus the original T, with a lexicon comprising all original words plus the acquired superwords. This preserves the granularity of the original lexicon, generating alternate paths comprising both the new phrases plus their original word sequences. I.e., if the words "long" and "distance" only occur together in the corpus leading to the acquisition of the phrase "long_distance", this final step preserves the possibility of recognizing the words occurring separately in some test utterance.

A decision is then made as to how to classify an utterance in a particularly straightforward manner. A speech recognizer is applied to an utterance, producing a single best word recognition output. This ASR output is then searched for occurrences of the salient phrase fragments. In case of fragment overlap, some parsing is required. The method for parsing is one in which longer fragments are selected over shorter ones proceeding left to right in the utterance. This yields a transduction from the utterance s to a sequence of associated call-types. To each of these fragments $f_i$ is associated the peak value and location of the a posteriori distribution.

$$P_i=\max_k P(C_k|f_i) \quad (4)$$

$$k_i=\arg \max_k P(C_k|f_i) \quad (5)$$

Thus, for each utterance s we have a sequence $\{f_i, k_i, p_i\}$. The decision rule is to select the call-type of the fragment with maximum $p_i$, i.e. select $C_{K(s)}$ where $$i(s)=\arg \max_i P_i \quad (6)$$

$$K(s)=k_{i(s)} \quad (7)$$

If this overall peak is less than some threshold, $P_T$, then the utterance is rejected and classified as other, i.e. if $p_{i(s)}<P_r$.

Several examples are given below, listing the transcription then ASR output using a phase-bigram grammar with the detected fragments highlighted via capitalization and bracketed via underscores. The transduction into call-types with associated scores is then given, with the peak fragment indicated via underlining.

Figure 2:
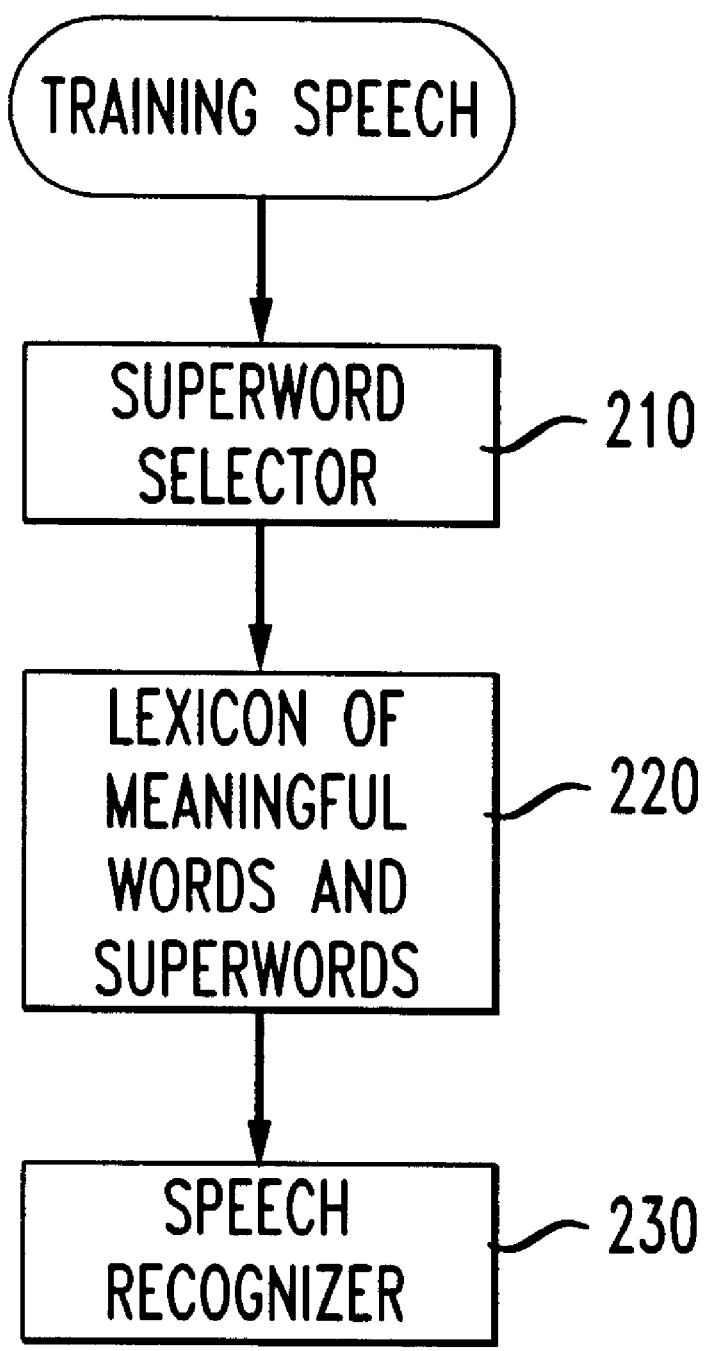
FIG. 2 is a block diagram showing the relationship of the superword selector, lexicon, and speech recognizer of the present invention.

FIG. 2 shows a possible configuration for the superword selector 210 of the present invention. Although this diagram shows how the present invention would apply to the recognition of input speech, the present invention is may be applied to the recognition of other forms of communication.

In FIG. 2, the superword selector 210 generates a ranked set of candidate phrases from meaningful words and phrases found in lexicon 220 from analyzing training speech. Meaningful words are salient words and phrases that have been previously identified as indicators that the user would like a particular task performed. The selection of meaningful words and phrases is found, for example, in U.S. Pat. No. 5,675,707, which is incorporated herein by reference.

From the analysis of training speech the superword selector 210 is able to determine words which recurrently appear in close proximity of each other in input training speech and identifies these word groups as candidate phrases. The superword selector 210 then inserts these candidate phrases one-at-a-time in the lexicon 220 and determines whether the perplexity value of the lexicon 220 decreases. If the perplexity value decreases, the candidate phrase is added to the lexicon 220 as a superword. If the perplexity value does not decrease, the candidate phrase is rejected. If the candidate phrase is added to the lexicon 220, a new perplexity value is computed and the next candidate phrase is evaluated.

The lexicon 220 can then be utilized by a speech recognizer 230 to assist in the recognition of superwords and meaningful words and phrases from input speech. The lexicon 220 provides a source of superwords and meaningful words and phrases to train the speech recognizer 230 on what words or phrases to identify in order for particular tasks to be performed, for example. The speech recognizer 230 can be any recognition device (speech, text, etc.) known to those skilled in the art.

Examples 1–4 demonstrate robustness of the salient fragments in the presence of recognition errors. The fifth example illustrates an ASR error which yielded a salient fragment, where 'stick it on my' was misrecognized as 'speak on my' (observing that stick was not in the training data, thus is an out-of-vocabulary word). The final example involves a user who thought they were talking to a hardware store. In this case, the recognizer performs poorly because of a large number of out-of-vocabulary words. However, the call-classification is indeed correct—leading to transfer to a human agent.

Examples of Call Classification

1. Transcr. yes, I just made a wrong telephone number

ASR+parse: not help me yes I_JUST_MADE_A long telephone number

Transd+decision: {CREDIT 0.87}

2. Transcr. hello operator I get somebody to speak spanish

ASR+parse: motel room you get somebody speak SPANISH

Transd+decision: {ATT SERVICE 0.64}

3. Transcr. hi can I have the area code for saint paul Minn.

ASR+parse: hi can THE_AREA_CODE_FOR austin for Minn.

Transd+decision: {AREA CODE 1.00}

4. Transcr. yes I wanted to charge a call to my business phone

ASR+parse: yes I_WANNA_CHARGE call to distance phone

Transd+decision: (THIRD NUMBER 0.75)

5. Transcr. hi I like to stick it on my calling card please

ASR+parse: hi I'D_LIKE_TO_SPEAK ON_MY_CALLING_CARD please

Transd+decision: (PERSON_PERSON 0.78) (CALLING CARD 0.96)

6. Transcr. I'm trying to find out a particular staple which fits one of your guns or a your desk staplers ASR+parse: I'm trying TO_FIND_OUT they've CHECKED this is still call which six one of your thompson area state for ask stay with the Transd+decision: (RATE 0.25) (OTHER 0.86)

Figure 3:
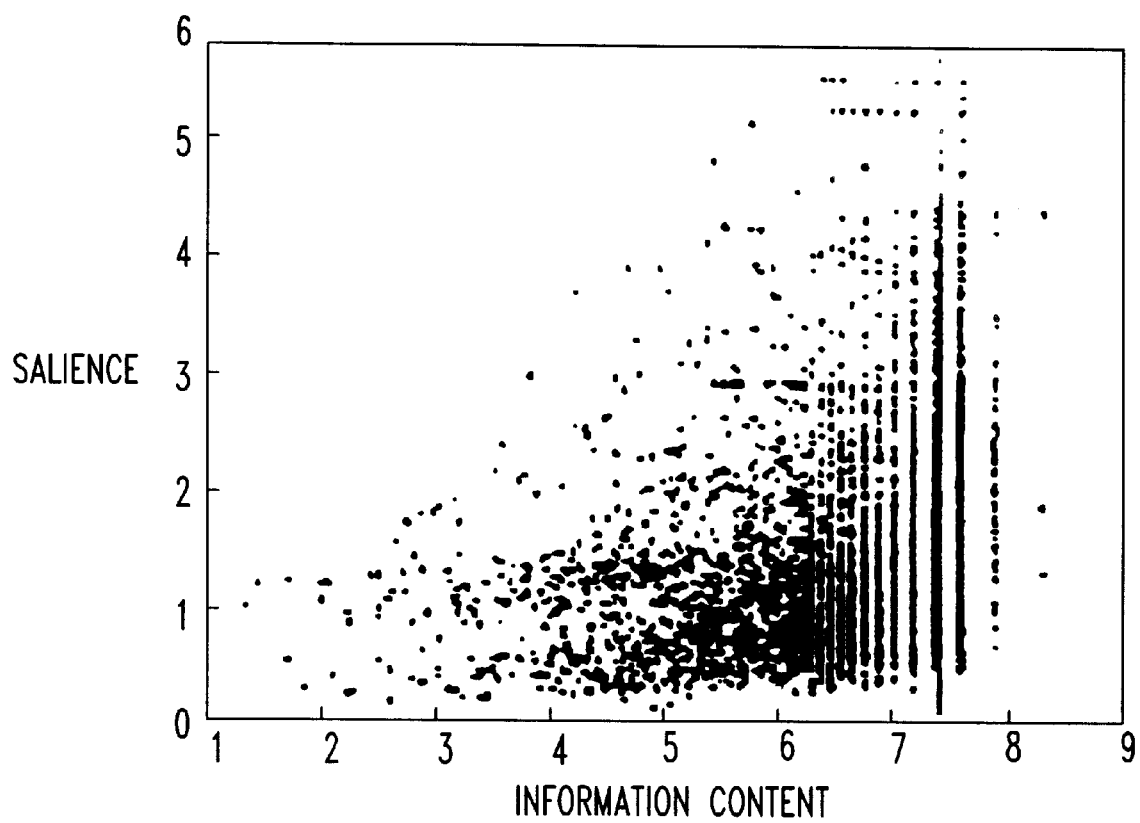
FIG. 3 is a chart showing salience versus information for phrase fragments.

Experiments were conducted on the above method and results are discussed below. A database was divided into 8K training and 1K test utterances. The remainder of the 10 K database has been reserved for future validation experiments. Salient phrase fragments were automatically generated from the training transcriptions and associated call-types. In particular, the length of these fragments was restricted to four or less and to have training-set frequency of five or greater. An initial filtering was imposed so that the peak of the a posteriori distribution for a fragment is 0.6 or greater. It is well known that the numerical value of salience is influenced by the fragment frequency, as is typical for information-theoretic measures. FIG. 3 shows a scatter plot of salience versus within-channel information content $i(f) = -\log_2[P(f)]$. It is thus advantageous to introduce a frequency-tilted salience threshold of the form $$sal(f) \geq \alpha i(f) + \beta \quad (8)$$

The values of $\alpha$ and $\beta$ can be varied and evaluated empirically. In the scatter plot of FIG. 3, two thresholds also shown: the vertical line for the frequency threshold, the other for the frequency-tilted salience threshold. In this experiment, we select the values of $\alpha$ and $\beta$ via a statistical significance test. For any particular fragment, we evaluate the null hypothesis that its observed a posteriori distribution $P(C_k|f)$ occurs as a random sample of the prior distribution $P(C_k)$. Computed via a multinomial distribution, a significance level of 1% is imposed, yielding the tilted salience threshold shown in FIG. 3. This reduces the total number of phrase fragments by about 20%. There are approximately 3K such salient fragments, with length distributed as in Table 1.

TABLE 1

Length Distribution of Salient Phrase Fragments.

| Length of Salient Fragment | 1 | 2 | 3 | 4 |
|---|---|---|---|---|
| Relative Frequency | 0.04 | 0.18 | 0.43 | 0.35 |

Using a speech recognizer, the VNSA language model is trained via 20 iterations of the algorithm in 4.2, with 50 candidates per iteration. For the phrase-bigram model, this yields 783 phrases in addition to the original 3.6 K word lexicon. The length of these fragments varies between 2 and 16, distributed as shown in Table 2.

TABLE 2

Length Distribution of VNSA Phrase Fragments.

| Length of VNSA Fragment | 2–3 | 4–5 | 6–7 | 8–16 |
|---|---|---|---|---|
| Relative Frequency | 0.88 | 0.07 | 0.03 | 0.02 |

Figure 4:
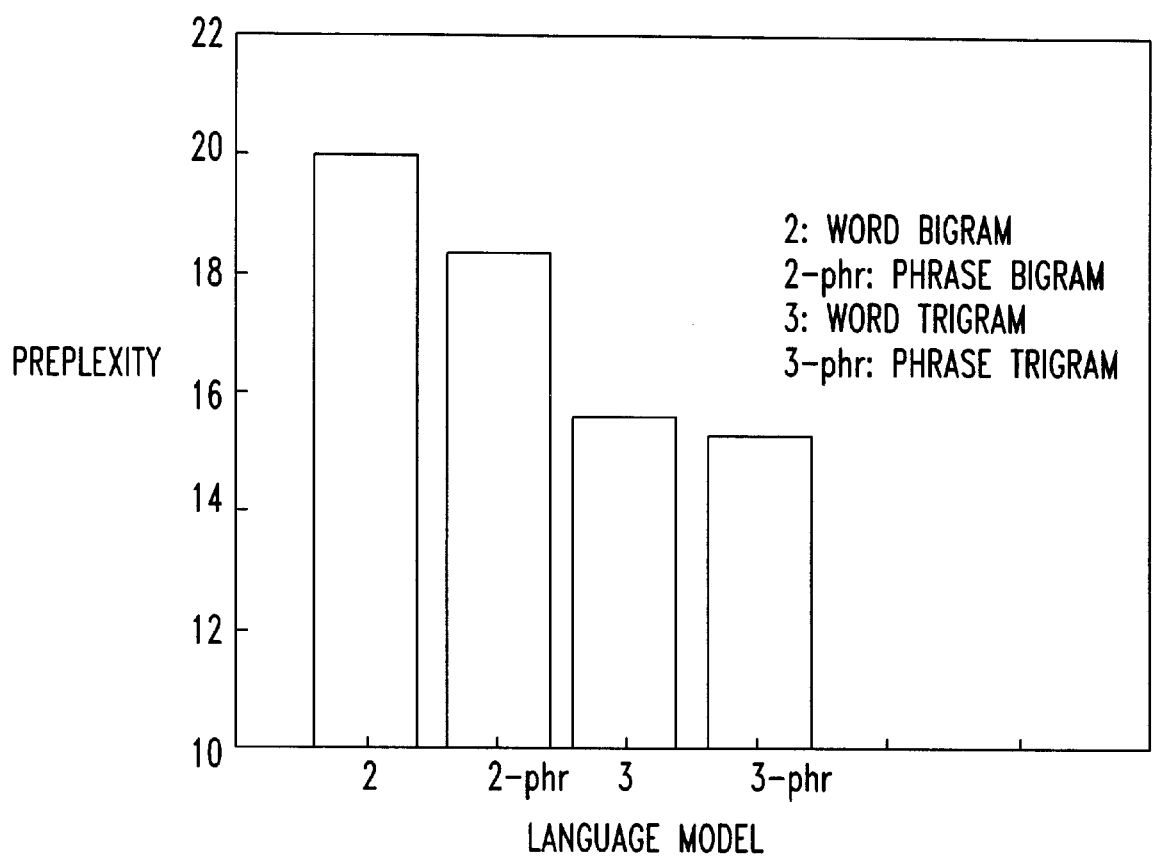
FIG. 4 is a chart showing test set perplexity versus language model.

First, word accuracy and perplexity are compared as a function of the language model. Table 3 shows the word accuracy (defined as probability of correct detection minus probability of insertion) as the language model is varied. Recall that phrase units comprise both the original lexicon of words plus variable-length phrases induced by entropy minimization. Bigrams and trigrams are $2^{nd}$ and $3^{rd}$ order models respectively on whichever lexicon is specified. FIG. 4 shows the test set perplexity as a function of language model units and order. Observe that in both of these within-language performance measures, phrase-bigrams fall between word-bigrams and word-trigrams, but with the computation and memory requirements of word-bigrams.

TABLE 3

Word Accuracy versus language Model.

| Unit Type | Bigram | Trigram |
|---|---|---|
| words | 49.5% | 52.7% |
| words + phrases | 50.5% | 52.7% |

The ASR output is then searched for salient fragments, as described in subsection 4.3. If no fragments are found, then the utterance is rejected and classified as other. The number of salient fragments per utterance found in the 1K test set varies between zero and 11, distributed as shown in Table 4.

TABLE 4

Number of Salient Fragments Recognized in an Utterance.

| Salient Fragments per Utterance | 0 | 1 | 2 | 3 | 4 | 5 | 6–11 |
|---|---|---|---|---|---|---|---|
| Relative frequency | 0.14 | 0.25 | 0.28 | 0.18 | 0.07 | 0.04 | 0.04 |

The salient fragments recognized in an utterance are then rank-ordered. The performance on the test data is now measured in terms of true classification rate and false rejection rate. For each test utterance, the decision between accept and reject is based on the top-ranked call type. If this "other", or if the associated probability fails to reach a designated threshold, then the call is rejected. Otherwise, the call is accepted and the accuracy of the attempted classification (at rank 1 and rank 2) is determined using the label set for that call. The desired goal for calls labeled "other" is that they be rejected. The false rejection rate is the proportion of calls not labeled "other" that are rejected. At rank 1, the true classification rate is the proportion of accepted calls for which the top-ranked call type is present in the label set.

At rank 2, the true classification rate is essentially the proportion of calls for which either the first or second highest ranked call type is present in the label set. However, for a small number of calls the label "other" is paired with another call type, and a rejection at rank 2 is then counted as a correct outcome for such a call. Such cases are included in the true classification rate at rank 2 because at that point the call has been accepted for handling by the dialog system and contributes to the measure of success appropriate to it.

With these definitions we can plot the ROC curve of true classification rate against false rejection rate. Next, the following notation and definitions for a particular utterance are introduced.

C is the list of call-type labels (recall that this is typically a single label)

$\hat{A}_1$ denotes the decision to accept the call at rank 1

$R_1$ and $R_2$ denote the decision to reject the call at rank 1 and rank 2 respectively $\hat{C}_1$ and $\hat{C}_2$ denote the rank 1 and rank 2 call types from the recognized fragments.

Then, over the set of 1 K test utterances, the following probabilities are measured:

False rejection rate=$P(R_1 | \text{other} \notin C)$ (9)

True classification rate (rank 1)=$P(\hat{C}_1 \in C | \hat{A}_1)$ (10)

True classification rate (rank 2)=$P((\hat{C}_1 \in C) \cup (\hat{C}_2 \in C) \cup (R_2 \cap \text{other} \in C) | \hat{A}_1)$ (11)

Figure 5:
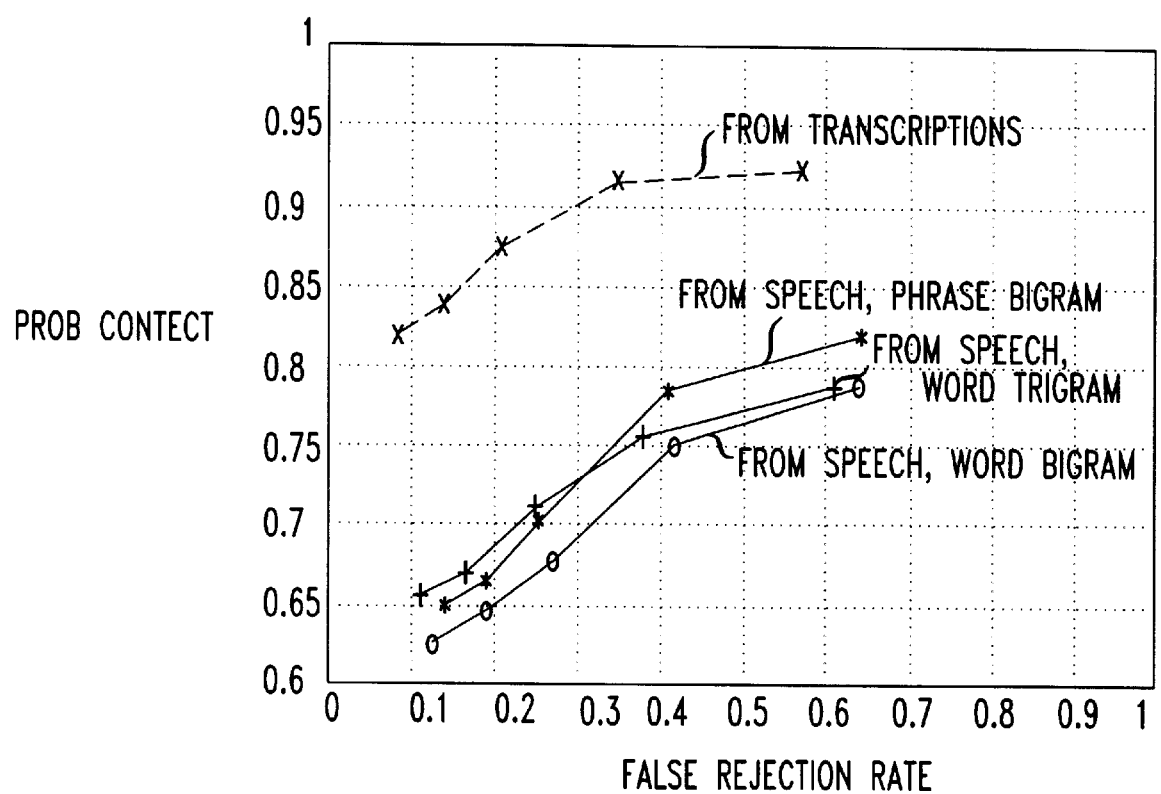
FIG. 5 shows a chart showing call-classification performance for varying ASR language models.

A performance curve is generated by varying the rejection threshold from 0.6 to 0.95. FIG. 5 shows the rank 1 performance curves for several different ASR language models. As a baseline for comparison, the performance on transcribed output (i.e., error-free ASR) is also shown. It is interesting to note that call-classification performance is significantly higher than word accuracy—confirming the intuition that some events are crucial to recognize for a task, others not so. It is also worthwhile noting that while the phrase-bigram language model for ASR performs worse than word-trigrams with respect to word accuracy, it performs better with respect to call-classification rate. This reinforces the intuition that optimizing recognition for understanding is an important research issue.

While this invention has been described in conjunction with specific embodiments thereof, it is evident that many alternatives, modifications and variations would be apparent to those skilled in the art. Accordingly, preferred embodiments in the invention as set forth herein are intended to be illustrative, not limiting. Various changes may be made without departing from the spirit and scope of the invention as defined in the following claims.

What is claimed is:

1. A method for determining superwords, comprising the steps of:

generating a set of candidate phrases from a database of observed sequences of words, symbols and/or sounds, the database having a perplexity value based on a language model;

incorporating one of the candidate phrases from the database into the language model;

analyzing how the perplexity value of the database, which is based on the language model, is affected by the incorporated candidate phrase; and determining if the candidate phrase is a superword based on the analyzing step.

2. The method of claim 1, wherein the determining step determines that if the perplexity value for the database decreases in the analyzing step, the candidate phrase is added to the database as a superword.

3. The method of claim 2, wherein the determining step further determines a new perplexity value for the database using the superword.

4. The method of claim 1, wherein the determining step determines that if the perplexity value for the database does not decrease in the analyzing step, the candidate phrase is rejected as a superword.

5. The method of claim 3, wherein the inserting, analyzing, and determining steps are repeated for another one of the candidate phrases using the new perplexity value.

6. The method of claim 1, wherein the superword is a word pairs.

7. The method of claim 1, wherein the superword is a plurality of adjacent words.

8. The method of claim 1, wherein the database is used by a speech recognizer.

9. An apparatus that determines superwords, comprising:

a database of observed sequences of words, symbols and/or sounds, the database having a perplexity value based on a language model;

generating means for generating candidate phrases from the database;

input means for incorporating one of the candidate phrases from the database into the language model;

analyzing means for analyzing how the perplexity value of the database, which is based on the language model, is affected by the incorporated candidate phrase, the analyzing means producing an output; and determining means for determining if the candidate phrase is a superword from the output of the analyzing means.

10. The apparatus of claim 9, wherein the determining means decides based on the output of the analyzing means that if the perplexity value for the database decreases, the candidate phrase is added to the database as a superword.

11. The apparatus of claim 10, wherein the determining means determines a new perplexity value for the database using the superword.

12. The apparatus of claim 11, wherein the analyzing means uses the new perplexity value determined by the determining means for another candidate phrase.

13. The apparatus of claim 9, wherein the determining means decides based on the output of the analyzing means that if the perplexity value of the database is not decreased, the candidate phrase is rejected.

14. The apparatus of claim 9, wherein the superword is a word pairs.

15. The apparatus of claim 9, wherein the superword is a plurality of adjacent words.

16. The apparatus of claim 9, wherein the database is used by a speech recognizer.

17. An apparatus that generates and selects superwords, comprising:

a database of observed sequences of words, symbols and/or sounds, the database having a perplexity value based on a language model; and a superword selector that generates candidate phrases from the database, the selector incorporating one of the candidate phrases from the database into the language model, the selector further analyzing how the perplexity value of the database, which is based on the language model, is affected by the incorporated candidate phrase and determining whether the candidate phrase is a superword based on the analysis.

18. The apparatus of claim 17, wherein if the superword selector determines that the perplexity value of the database decreases when the candidate phrase is inserted into the database, the candidate phrase is added to the database as a superword.

19. The apparatus of claim 17, wherein if the superword selector determines that the perplexity value is not decreased when the candidate phrase is inserted into the database, the candidate phrase is rejected as a superword.

20. The apparatus of claim 17, further comprising:

a recognizer that uses the database to recognize any of the superwords contained in a user's input.

21. The apparatus of claim 20, wherein the recognizer is a speech recognizer and the user's input is speech.

\* \* \* \* \*